United States Patent
Bergum

(10) Patent No.: US 8,336,385 B1
(45) Date of Patent: Dec. 25, 2012

(54) PRESSURE SENSOR DIAPHRAGM SYSTEM

(75) Inventor: Alan J. Bergum, Detroit Lakes, MN (US)

(73) Assignee: S.J. Electro Systems, Inc., Detroit Lakes, MN (US)

( * ) Notice: Subject to any disclaimer, the term of this patent is extended or adjusted under 35 U.S.C. 154(b) by 190 days.

(21) Appl. No.: 13/043,899

(22) Filed: Mar. 9, 2011

Related U.S. Application Data

(60) Provisional application No. 61/340,087, filed on Mar. 11, 2010.

(51) Int. Cl.
*G01L 7/08* (2006.01)
(52) U.S. Cl. .......................................... 73/715; 73/706
(58) Field of Classification Search .................. None
See application file for complete search history.

(56) References Cited

U.S. PATENT DOCUMENTS

| | | | | |
|---|---|---|---|---|
| 3,142,794 | A | * | 7/1964 | Pegram ............................ 336/30 |
| 3,290,945 | A | * | 12/1966 | Tzu Li Yao et al. ............. 73/716 |
| 4,221,134 | A | * | 9/1980 | Ekstrom, Jr. ..................... 73/721 |
| 4,663,608 | A | * | 5/1987 | Kelly .............................. 340/449 |
| 5,065,010 | A | * | 11/1991 | Knute ....................... 250/227.21 |
| 5,425,371 | A | * | 6/1995 | Mischenko ....................... 73/705 |
| 5,587,601 | A | * | 12/1996 | Kurtz .............................. 257/417 |
| 5,601,071 | A | * | 2/1997 | Carr et al. ................... 126/116 A |
| 7,434,472 | B2 | * | 10/2008 | Leitko et al. ..................... 73/716 |

* cited by examiner

*Primary Examiner* — Andre Allen
(74) *Attorney, Agent, or Firm* — Michael S. Neustel

(57) ABSTRACT

A pressure sensor diaphragm system for efficiently and accurately measuring fluid pressure in harsh environments. The pressure sensor diaphragm system generally includes a pressure transducer, a diaphragm, and a pressure fluid within the diaphragm that is fluidly connected to the pressure transducer to transfer pressure from the diaphragm to the pressure transducer. The diaphragm is comprised of a deformable structure and is preferably comprised of a bellows structure having a plurality of furrow portions and a plurality of ridge portions.

20 Claims, 6 Drawing Sheets

PRESSURE SENSOR DIAPHRAGM SYSTEM

CROSS REFERENCE TO RELATED APPLICATIONS

I hereby claim benefit under Title 35, United States Code, Section 119(e) of U.S. provisional patent application Ser. No. 61/340,087 filed Mar. 11, 2010. The 61/340,087 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to pressure sensors and more specifically it relates to a pressure sensor diaphragm system for efficiently and accurately measuring fluid pressure in harsh environments.

2. Description of the Related Art

Any discussion of the related art throughout the specification should in no way be considered as an admission that such related art is widely known or forms part of common general knowledge in the field.

Fluid pressure sensors are utilized to measure fluid pressure to determine the fluid depth, fluid level, and other variables related to the fluid. Fluid pressure sensors are typically comprised of a pressure transducer that converts the fluid pressure to an electrical signal that can be utilized to provide a level measurement of fluid in a tank (e.g. septic tank), pumping chamber or other fluid tank. Conventional pressure sensors utilize a flat diaphragm comprised of a resilient material such as rubber. The pressure sensor is positioned within the fluid with the flat diaphragm measuring the pressure of the fluid to determine the level of fluid. The external fluid pressure causes a piston adjacent to the flat diaphragm or a liquid to be compressed. The compression force is transferred to a pressure transducer which converts the pressure to an electrical signal which can then be used to provide a measurement reading, provide a warning, activate a pump or other actions based on the measurement. The pressure transducer can be in communication with any external device such as but not limited to a pump switch, a circuit board, a display, a warning device and the like.

The main problem with conventional flat diaphragms is that they are prone to significant pressure drops thereby providing inaccurate pressure readings, particularly in harsh environments like septic tanks and pumping chambers. For example, sludge, grease and mineral buildup on the flat diaphragm increase the pressure drop.

Part of the problem is because of the limited surface area a flat diaphragm has. The surface area can be increased to reduce the pressure drop, however, the width of the pressure sensor increases accordingly which is not desirable in a lot of situations. Another part of the problem with flat diaphragms is that the diaphragm itself must stretch when fluid pressure is applied thereby resulting in another increased pressure drop during usage which can become increasingly larger as the material of the diaphragm becomes older and less flexible and stretchable.

Because of the inherent problems with the related art, there is a need for a new and improved pressure sensor diaphragm system for efficiently and accurately measuring fluid pressure in harsh environments.

BRIEF SUMMARY OF THE INVENTION

A system for efficiently and accurately measuring fluid pressure in harsh environments. The invention generally relates to a pressure sensor which includes a pressure transducer, a diaphragm, and a pressure fluid within the diaphragm that is fluidly connected to the pressure transducer to transfer pressure from the diaphragm to the pressure transducer. The diaphragm is comprised of a deformable structure and is preferably comprised of a bellows structure having a plurality of furrow portions and a plurality of ridge portions.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
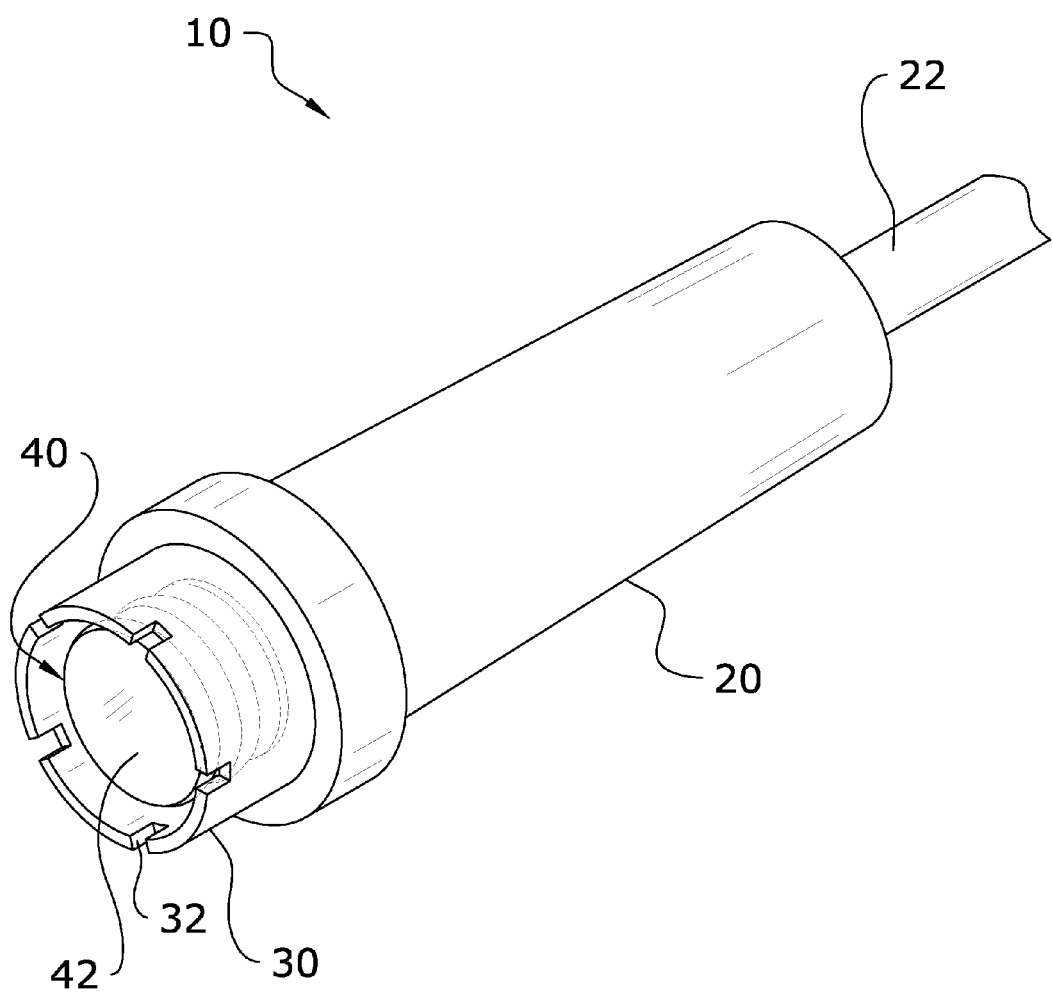
FIG. 1 is an upper perspective view of the present invention.

Turning now descriptively to the drawings, in which similar reference characters denote similar elements throughout the several views, FIGS. 1 through 6 illustrate a pressure sensor diaphragm system 10, which comprises a pressure transducer 24, a diaphragm 40, and a pressure fluid within the diaphragm 40 that is fluidly connected to the pressure transducer 24 to transfer pressure from the diaphragm 40 to the pressure transducer 24. The diaphragm 40 is comprised of a deformable structure and is preferably comprised of a bellows structure having a plurality of furrow portions 44 and a plurality of ridge portions 46.

B. Liquid Container

Figure 6:
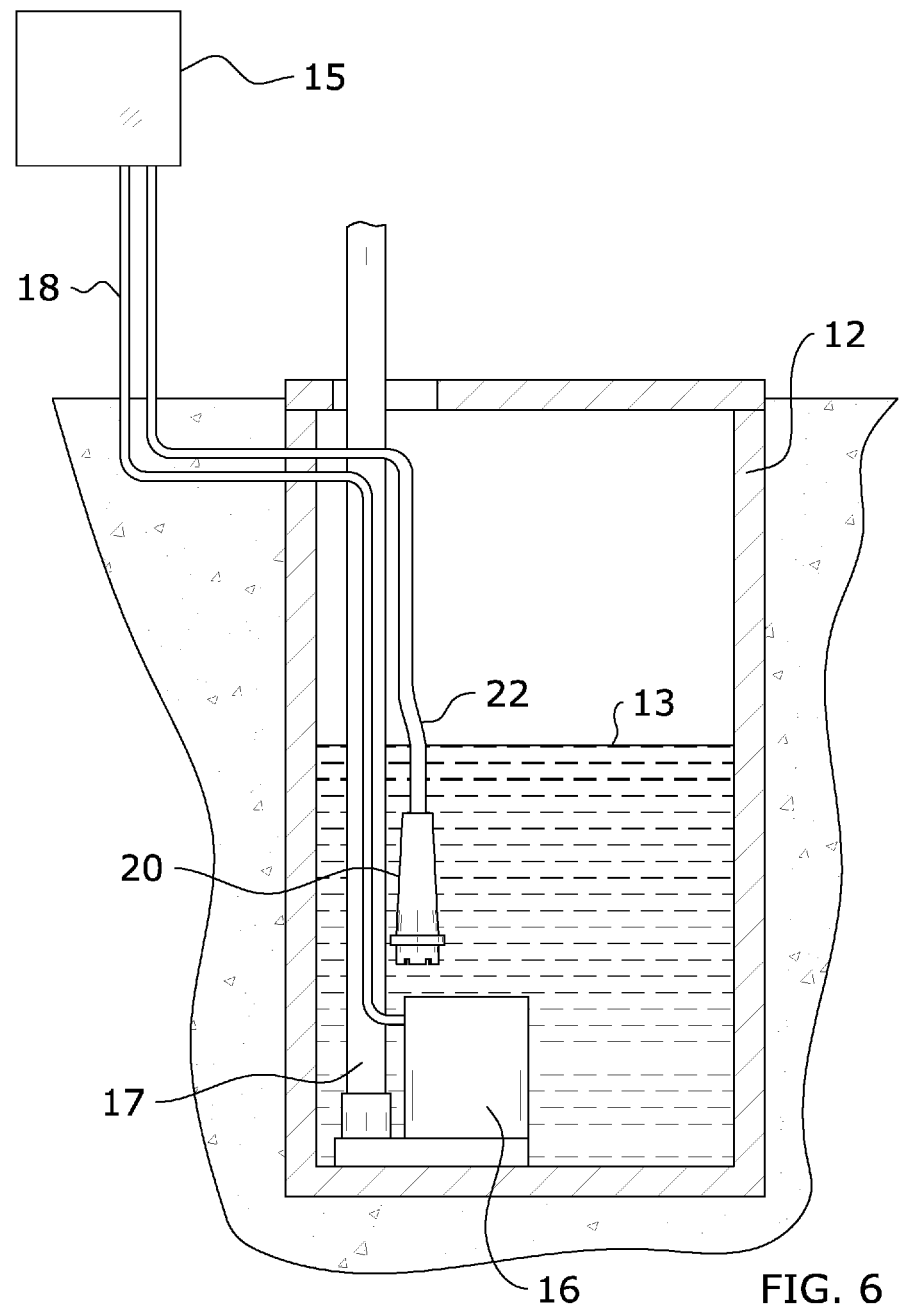
FIG. 6 is a side view of the present invention positioned within a liquid container.

FIG. 6 illustrates an exemplary liquid container 12 comprised of a septic tank suitable for usage with the present invention. The liquid container 12 is adapted to receive a volume of liquid (e.g. water) and retain the liquid for a period of time. As shown in FIG. 6 of the drawings, a pump 16 may be positioned within the liquid container 12 to pump 16 out liquid from the liquid container 12 through a discharge pipe 17. A junction box 15 may be in communication with the pump 16 via a power cord 18 to activate the pump 16 and to the pressure transducer 24 via a communications cable. The junction box 15 may include additional electronic devices as is well known in the septic tank industry.

C. Sensor Housing

Figure 3:
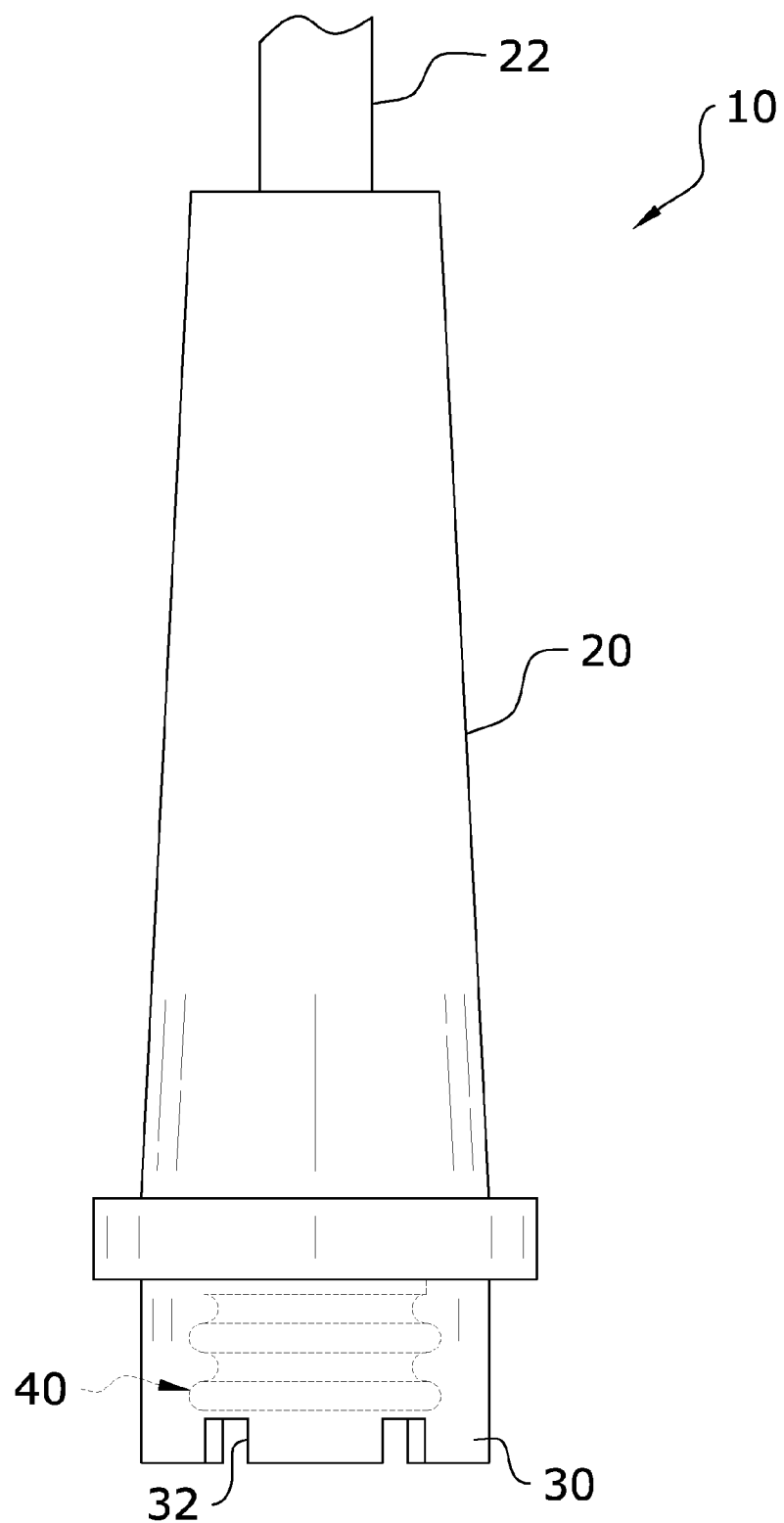
FIG. 3 is a side view of the present invention.

FIGS. 1 and 3 illustrate an exemplary sensor housing 20. The sensor housing 20 may have various shapes and configurations capable of storing the electronic devices and other components relating to the pressure sensor such as but not limited to the pressure transducer 24, a circuit board and the like. The sensor housing 20 is illustrated as an elongated structure however various other configuration for the sensor housing 20 may be utilized. The sensor housing 20 may be positioned in a stationary location within the liquid container 12 utilizing various connection devices such as but not limited to straps and clamps. The lower end of the sensor housing 20 where the diaphragm 40 extends from is preferably located at the desired depth within the liquid container 12 where the fluid pressure is to be read.

D. Pressure Transducer

The pressure transducer 24 may be comprised of any pressure sensor device that is capable of receiving and measuring physical pressure from pressure fluid within the diaphragm 40 and converting the measured pressure to an electrical signal (e.g. piezoresistive pressure sensor or silicon cell). The electrical signal is communicated via the communication cable 22 to the junction box 15 where the signal may be calculated and utilized to control a pump 16 operation, cause an alarm or other actions based on the measurement.

A pressure passage 26 is fluidly connected between the interior of the diaphragm 40 and the pressure transducer 24 to transfer the fluid pressure from the pressure fluid within the diaphragm 40 to the pressure transducer 24. A vent tube 28 is preferably in fluid communication with the pressure transducer 24 and extends outwardly above the liquid level 13 within the liquid container 12 to provide a normal atmospheric pressure opposite of the pressure from the pressure fluid received from the diaphragm 40.

E. Diaphragm

The diaphragm 40 is comprised of a flexible and deformable structure as illustrated in FIGS. 1 through 5b of the drawings. The diaphragm 40 is not a flat structure and preferably has no mechanical component attached within the interior thereof. The diaphragm 40 is preferably constructed of a flexible and resilient material such as but not limited to rubber. The diaphragm 40 is sealed with respect to the pressure transducer 24. The diaphragm 40 is positioned within and measures a fluid pressure of the external liquid within the liquid container 12.

The diaphragm 40 surrounds and retains a pressure fluid within the diaphragm 40. The pressure fluid is preferably comprised of a relatively non-compressible and non-expandable fluid such as but not limited to oil to efficiently transfer the external fluid pressure applied to the diaphragm 40 to the pressure transducer 24. The pressure fluid preferably has no or a limited amount of air or other gases that can be compressed or expand based on temperature.

Figure 4A:
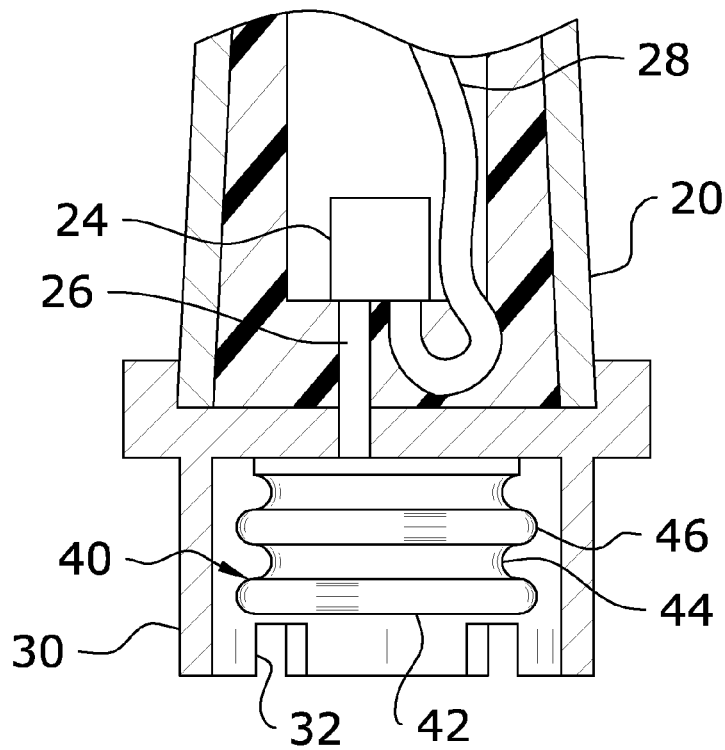
FIG. 4a is a side cutaway view of the present invention illustrating the corrugated diaphragm structure in a normal state.
Figure 4B:
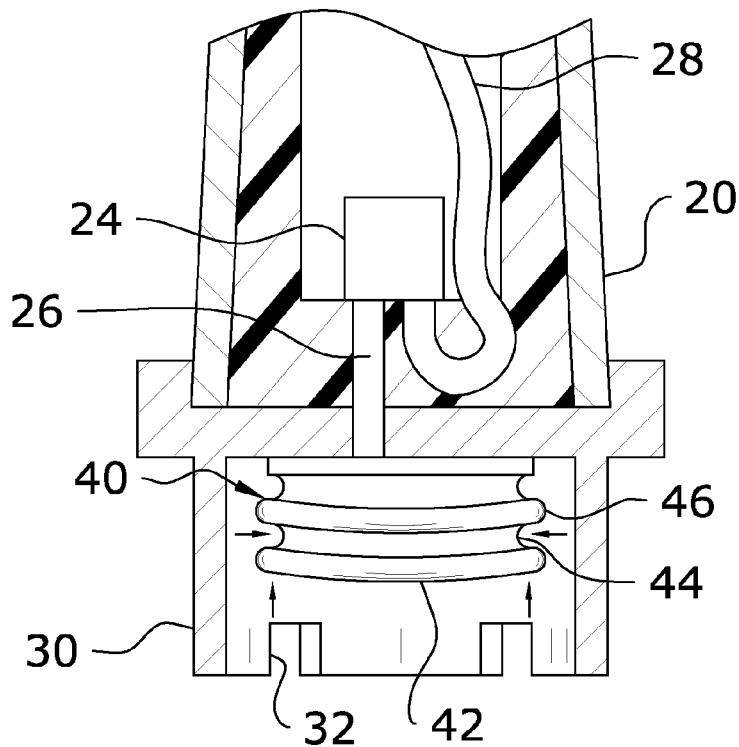
FIG. 4b is a side cutaway view of the present invention illustrating the corrugated diaphragm structure in a partially compressed state.

The base portion of the diaphragm 40 is preferably attached to the sensor housing 20 and is sealed with respect to the pressure passage 26 to ensure that the pressure fluid is retained in a closed environment. The base portion may be sealed directly to the sensor housing 20 around the pressure passage 26 as illustrated in FIGS. 4a and 4b of the drawings.

The diaphragm 40 preferably includes a distal portion 42 extending outwardly away from the sensor housing 20 and at least one sidewall 48. As illustrated in FIGS. 4a through 5b of the drawings, the distal portion 42 of the diaphragm 40 is preferably a substantially flat and relatively broad structure. The body of the diaphragm 40 is preferably comprised of a hollow cylindrical structure wherein the pressure fluid is stored within, wherein the diaphragm 40 is compressible based on the external fluid pressure. The diaphragm 40 preferably has a circular cross sectional area, however various other cross sectional areas may be utilized such as square or rectangular. The diaphragm 40 further preferable extends outwardly and away from the sensor housing 20 to maximize the amount of direct contact of the diaphragm 40 with the external fluid (e.g. water within the liquid container 12).

As illustrated in FIGS. 1, 3, 4a and 4b of the drawings, the diaphragm 40 is preferably comprised of a bellows structure having a plurality of furrow portions 44 and a plurality of ridge portions 46 that form a corrugated structure. The bellows structure provides an increased external surface area for the diaphragm 40 for the external fluid to engage and press against. In addition, the bellows structure is capable of compressing and expanding easily without significant stretching of the diaphragm 40 required. Furthermore, the bellows structure allows the diaphragm 40 to be pressed upon by a user's finger or other object without creating a damaging pressure upon the pressure transducer 24 since the body of the diaphragm 40 is capable of expanding.

Figure 5A:
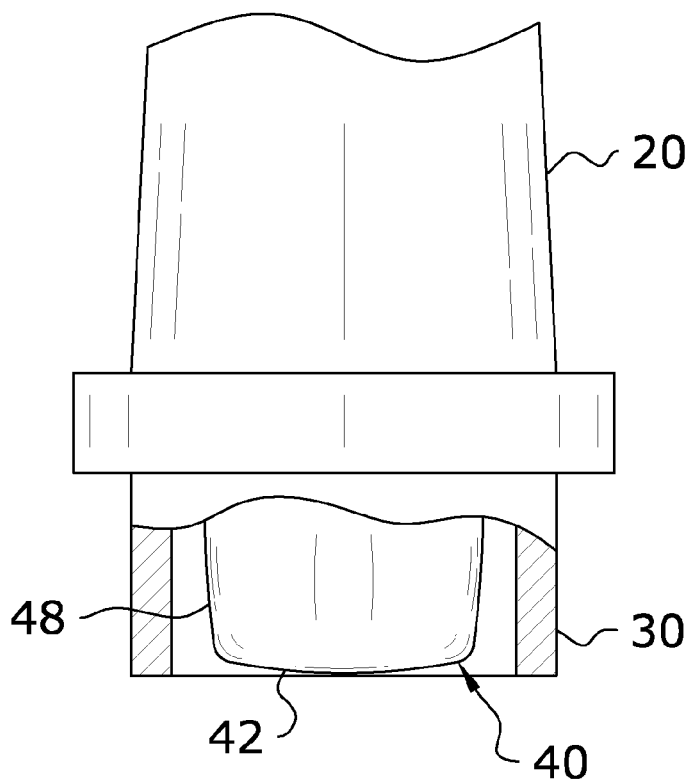
FIG. 5a is a side cutaway view of an alternative embodiment of the present invention having relatively flat sides in a normal state.
Figure 5B:
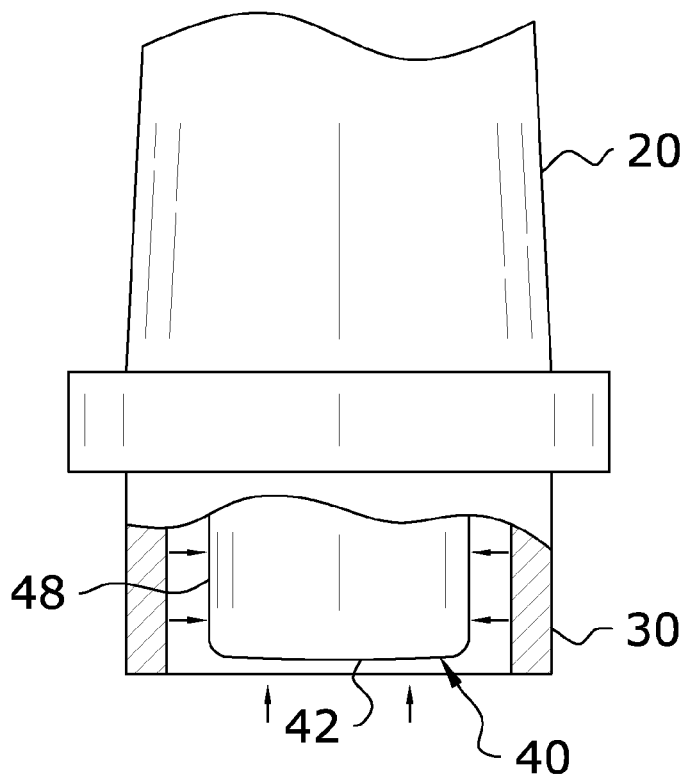
FIG. 5b is a side cutaway view of an alternative embodiment of the present invention having relatively flat sides in a partially compressed state.

FIGS. 5a and 5b illustrate an alternative embodiment where the diaphragm 40 is comprised of a substantially cylindrical structure having a relatively flat sidewall 48 and a substantially flat distal portion 42 that is transverse with respect to the sidewall 48. This alternative embodiment is not as flexible as the bellows structure shown in FIGS. 1, 3, 4a and 4b of the drawings, however, this alternative embodiment does provide an increased surface area to receive pressure from the surrounding fluid.

F. Protective Member

As further illustrated in FIGS. 1 through 5b of the drawings, a protective member 30 extends outwardly from the sensor housing 20 and surrounds the sidewall 48 of the diaphragm 40. It is preferable that the protective member 30 extend past the distal portion 42 of the diaphragm 40 to protect the diaphragm 40 from engaging physical structures within the liquid container 12 or being damaged.

Figure 2:
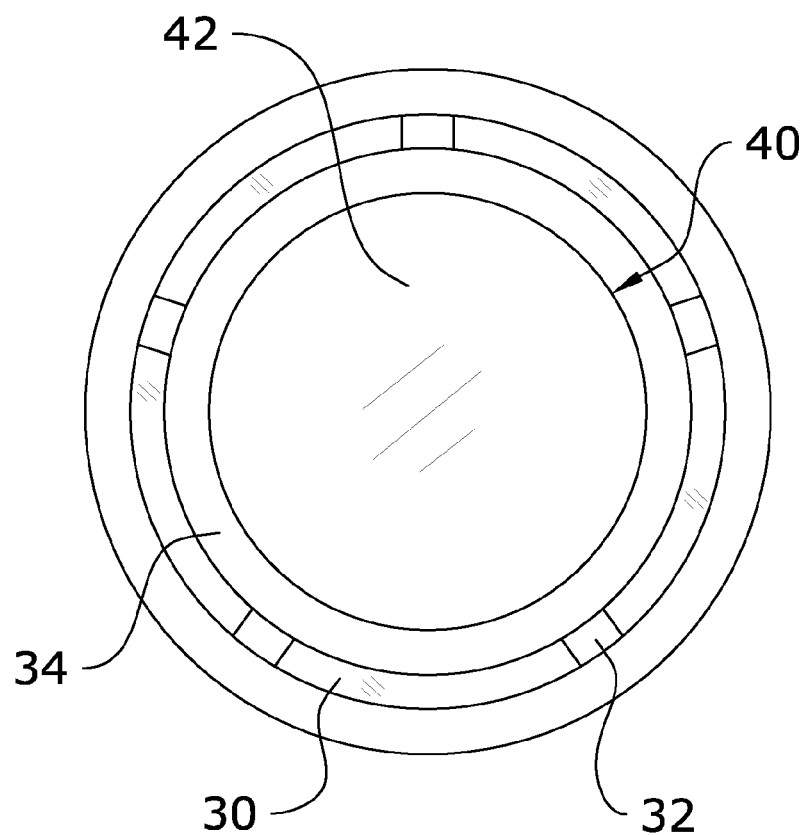
FIG. 2 is an end view of the present invention.

The protective member 30 is distally spaced away from the at least one sidewall 48 of the diaphragm 40 forming a spacing 34 adapted to receive the external liquid without interrupting the flow of the external liquid. The protective member 30 preferably includes a plurality of cutouts 32 within a distal end of the protective member 30 to allow the external liquid to pass through while still protecting the diaphragm 40. The protective member 30 preferably has a shape similar to the external shape of the diaphragm 40 as illustrated in FIG. 2 of the drawings.

G. Operation of Preferred Embodiment

In use, the user positions the sensor housing 20 within the liquid container 12 such as a septic tank so that the diaphragm 40 is positioned at the level where the external fluid pressure is to be read. When the liquid container 12 receives liquid such as water, the liquid level 13 rises to and then above the diaphragm 40 as illustrated in FIG. 6 of the drawings. As the liquid level 13 rises above the diaphragm 40, the diaphragm 40 compresses as illustrated in FIGS. 4b and 5b of the drawings. The compression of the diaphragm 40 causes the pressure fluid within the diaphragm 40 to pass the pressure to the fluidly connected pressure transducer 24 which calculates the pressure and converts the calculation to an electrical signal. The electrical signal is transferred via the communication cable 22 to a junction box 15 so as to allow a pump 16 within the liquid container 12 to be activated when the liquid level 13 reaches a present level.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A fluid pressure sensor, comprising:
a pressure transducer; and
a diaphragm surrounding a pressure fluid within said diaphragm, wherein said pressure fluid is fluidly connected to said pressure transducer to transfer external fluid pressure from said diaphragm to said pressure transducer, wherein said diaphragm is comprised of a flexible and deformable structure, and wherein diaphragm is not a flat structure.

2. The fluid pressure sensor of claim 1, including a liquid container, wherein said diaphragm is positioned within and measures a fluid pressure within said liquid container.

3. The fluid pressure sensor of claim 1, wherein said tank is comprised of a septic tank.

4. The fluid pressure sensor of claim 1, wherein said diaphragm is comprised of a cylindrical structure.

5. The fluid pressure sensor of claim 1, wherein said diaphragm is comprised of a bellows structure.

6. The fluid pressure sensor of claim 5, wherein said diaphragm is comprised of a plurality of furrow portions and a plurality of ridge portions.

7. The fluid pressure sensor of claim 1, wherein said diaphragm is comprised of a distal portion and a sidewall.

8. The fluid pressure sensor of claim 7, wherein said distal portion and said sidewall are substantially flat.

9. The fluid pressure sensor of claim 7, wherein said distal portion is substantially flat and wherein said sidewall has a substantially corrugated structure.

10. The fluid pressure sensor of claim 1, wherein said diaphragm includes a base portion attached to a sensor housing, a distal portion extending outwardly away from said sensor housing and at least one sidewall.

11. A fluid pressure sensor, comprising:
a sensor housing;
a pressure transducer;
a diaphragm surrounding a pressure fluid within said diaphragm, wherein said pressure fluid is fluidly connected to said pressure transducer to transfer external fluid pressure from said diaphragm to said pressure transducer, wherein said diaphragm is comprised of a flexible and deformable structure, and wherein diaphragm is not a flat structure;
wherein said diaphragm includes a base portion attached to a sensor housing, a distal portion extending outwardly away from said sensor housing and at least one sidewall; and
a protective member extending outwardly from said sensor housing and surrounding said at least one sidewall, wherein said protective member is distally spaced away from said at least one sidewall of said diaphragm forming a spacing adapted to receive an external liquid.

12. The fluid pressure sensor of claim 11, including a liquid container, wherein said diaphragm is positioned within and measures a fluid pressure of said external liquid within said liquid container.

13. The fluid pressure sensor of claim 11, wherein said tank is comprised of a septic tank.

14. The fluid pressure sensor of claim 11, wherein said diaphragm is comprised of a cylindrical structure.

15. The fluid pressure sensor of claim 11, wherein said diaphragm is comprised of a bellows structure.

16. The fluid pressure sensor of claim 15, wherein said diaphragm is comprised of a plurality of furrow portions and a plurality of ridge portions.

17. The fluid pressure sensor of claim 11, wherein said protective member includes a plurality of cutouts within a distal end of said protective member.

18. The fluid pressure sensor of claim 17, wherein said distal portion and said sidewall are substantially flat.

19. The fluid pressure sensor of claim 17, wherein said distal portion is substantially flat and wherein said sidewall has a substantially corrugated structure.

20. A combination liquid container and fluid pressure sensor for measuring a fluid pressure within said liquid container, comprising:
a liquid container comprised of a septic tank adapted to receive a volume of external liquid;
a sensor housing;
a pressure transducer;
a diaphragm surrounding a pressure fluid within said diaphragm, wherein said pressure fluid is fluidly connected to said pressure transducer to transfer external fluid pressure from said diaphragm to said pressure transducer, wherein said diaphragm is comprised of a flexible and deformable structure, and wherein diaphragm is not a flat structure;
wherein said diaphragm includes a base portion attached to said sensor housing, a distal portion extending outwardly away from said sensor housing and at least one sidewall;

wherein said diaphragm is comprised of a bellows structure having a plurality of furrow portions and a plurality of ridge portions;
wherein said diaphragm is sealed with respect to said pressure transducer;
wherein said diaphragm is positioned within and measures a fluid pressure of said external liquid within said liquid container; and
a protective member extending outwardly from said sensor housing and surrounding said at least one sidewall, wherein said protective member is distally spaced away from said at least one sidewall of said diaphragm forming a spacing adapted to receive said external liquid.

* * * * *